United States Patent
Zhang et al.

(10) Patent No.: US 10,164,401 B1
(45) Date of Patent: Dec. 25, 2018

(54) METHOD FOR GENERATING SUB-NANOSECOND PULSE LASER

(71) Applicant: Shanxi University, Taiyuan (CN)

(72) Inventors: Kuanshou Zhang, Taiyuan (CN); Xin Zhao, Taiyuan (CN); Yuanji Li, Taiyuan (CN); Jinxia Feng, Taiyuan (CN)

(73) Assignee: Shanxi University, Taiyuan (CN)

( * ) Notice: Subject to any disclaimer, the term of this patent is extended or adjusted under 35 U.S.C. 154(b) by 0 days.

(21) Appl. No.: 15/865,782

(22) Filed: Jan. 9, 2018

(30) Foreign Application Priority Data

Oct. 16, 2017  (CN) .......................... 2017 1 0961970

(51) Int. Cl.
*H01S 3/115* (2006.01)
*H01S 3/0941* (2006.01)
*H01S 3/107* (2006.01)

(52) U.S. Cl.
CPC ............ *H01S 3/115* (2013.01); *H01S 3/0941* (2013.01); *H01S 3/107* (2013.01)

(58) Field of Classification Search
CPC ......... H01S 5/107; H01S 5/115; H01S 3/1075
See application file for complete search history.

(56) References Cited

U.S. PATENT DOCUMENTS

| | | | | |
|---|---|---|---|---|
| 5,204,867 A | * | 4/1993 | Koschmann | ............ H01S 3/136 372/10 |
| 6,197,133 B1 | * | 3/2001 | Unternahrer | ......... C21D 10/005 148/525 |
| 2015/0207292 A1 | * | 7/2015 | Jonuska | ................ G02F 1/0327 372/12 |

OTHER PUBLICATIONS

Vuylsteke ("Theory of laser regeneration switching", Journal of Applied Physics, vol. 34, No. 6, Jun. 1963).*
Alsous ("Q-switch rise time effect in flash pumped solid state lasers", Laser Physics, 2010, vol. 20, No. 5, pp. 1095-1100) (Year: 2010).*

* cited by examiner

*Primary Examiner* — Tod T Van Roy
(74) *Attorney, Agent, or Firm* — Wood Herron & Evans LLP

(57) ABSTRACT

A method is disclosed for generating a sub-nanosecond pulse laser, using a voltage-increased type electro-optical Q-switched laser. The method includes: applying a square wave driving signal on a Pockels cell in an electro-optical Q-switched laser by using a Q-switch driver module, where the peak voltage of the square wave driving signal is higher than the quarter-wave voltage of the Pockels cell; and performing, by controlling the loss related to the electro-optical Q switch with a voltage of the driving signal increasing from 0 to the peak voltage, a change of the working state of the electro-optical Q switch from a switched-off state to a switched-on state, and then to a partially-switched-on state. The intracavity laser is exhausted within a quite short time, so that the pulse width of the laser is shortened, to implement sub-nanosecond operation of a pulse laser.

4 Claims, 3 Drawing Sheets

METHOD FOR GENERATING SUB-NANOSECOND PULSE LASER

CROSS-REFERENCE TO RELATED APPLICATION

This application claims priority to Chinese Application No. 201710961970.1, filed Oct. 16, 2017, which is incorporated herein by reference in its entirety.

TECHNICAL FIELD

The present invention relates to the field of laser technologies, and more particularly, to a method for generating a sub-nanosecond pulse laser.

BACKGROUND

A voltage-increased type electro-optical Q-switched pulse laser generally includes a gain medium 5, an input coupler 4, an output coupler 9, a Pockels cell 7, a quarter-wave plate 8, a polarizer 6, and a pump source 1, and these elements are shown, for example, in FIG. 1 (which illustrates laser equipment that may also be used to perform the methods of the present invention described in further detail below). The angle between a principal axis of the quarter-wave plate 8 and a transmissive direction of the polarizer 6 is 45°. The Pockels cell 7 and the quarter-wave plate 8 form an electro-optical Q switch, which is used for controlling the polarization direction of an intracavity laser beam. When the voltage from an electro-optical Q-switch driver module 3 is set as 0 and applied to the Pockels cell 7, the polarization direction of the intracavity laser beam rotates by 90° after passing through the Q switch two times, and the resonator is in a high-loss state. In this case, the pump energy is absorbed by the laser gain medium 5 leading to an accumulation of inverted populations. When the inverted populations reach the maximum, a square-wave signal whose peak voltage is equal to the quarter-wave voltage of the Pockels cell 7 is used, to thereby obtain a giant pulse laser output.

To obtain a pulse laser with sub-nanosecond level pulse width, both a short rising edge time and a short high-level voltage duration of the square wave driving signal are required. However, in practice, the Q-switch driver module 3 with a rising edge time of a few nanoseconds always needs to keep a specific high level duration, which makes a part of laser photons oscillate back and forth in the resonator. As a result, the falling edge time of a laser pulse is prolonged, and the laser pulse width is increased (e.g., beyond the sub-nanosecond level).

To decrease the pulse width of a laser pulse, the following technologies are generally used: shortening resonator length, increasing transmittance of output coupler, active/passive dual Q-switching, and the like. Each of these methods has failed to reliably decrease the pulse width to beyond the sub-nanosecond level. Because the resonator length is limited by sizes of gain medium and other intracavity components, it is difficult to build a sub-nanosecond high-energy laser operating at a high repetition frequency when the method of using a short resonator is used. When the method of increasing transmittance of output coupler is used, the laser pulse width can be decreased by increasing pump power, but there remain problems with such a method, including potential thermal damage of a laser crystal due to a relatively high threshold, and widening of the rising edge of a laser pulse due to high loss. In the active/passive dual Q-switching method, an additional element needs to be inserted into the resonator, and consequently, the resonator length is increased, and it is also relatively difficult to implement output of a sub-nanosecond laser.

Therefore, it would be desirable to overcome these issues in known methods of forming a laser, such that a sub-nanosecond pulse laser is reliably generated.

SUMMARY

An objective of the present invention is to provide a method for generating a sub-nanosecond pulse laser. The method can be used to shorten the falling edge time of a laser pulse with a conventional resonator length and without any inserted component, to implement a reliable output of a sub-nanosecond pulse laser.

To achieve the above objective, the present invention provides the following solution. A method for generating a sub-nanosecond pulse laser is provided, in accordance with one embodiment of the invention. The method is applied to a voltage-increased type electro-optical Q-switched laser, and the method includes:

absorbing, by a laser gain medium in the electro-optical Q-switched laser, pump light; generating and accumulating inverted populations; and when the inverted populations are accumulated to maximum, generating a control signal, and sending the control signal to a Q-switch driver module;

applying, by the Q-switch driver module, a driving signal on a Pockels cell in an electro-optical Q switch under trigger of the control signal, where the electro-optical Q switch includes a quarter-wave plate and the Pockels cell, and the driving signal is a square-wave signal whose peak voltage is higher than the quarter-wave voltage of the Pockels cell; and performing, by the driving signal, a change of the refractive index of the Pockels cell in the electro-optical Q switch, so that the polarization direction of the intracavity laser beam, polarized by a polarizer, rotates after the beam passing through the electro-optical Q switch; performing, by controlling the loss related to the electro-optical Q switch with a voltage of the driving signal increasing from 0 to the peak voltage, a change of the working state of the electro-optical Q switch from a switched-off state to a switched-on state, and then to a partially-switched-on state, where when the Q switch is switched-off, the laser gain medium absorbs the pump light to implement population inversion and accumulation; and when the Q switch is partially switched on, an intracavity laser oscillates back and forth in the resonator, and a pulse laser is coupled out through both the output coupler and the polarizer.

In one aspect, the method includes performing at least one of theoretical simulation and experimental optimization on the peak voltage of the driving signal to obtain an optimum value to produce the shortest pulse width of the laser. To this end, the method includes substituting a set of laser parameters into laser rate equations to perform theoretical simulation to obtain a correspondence between the peak voltage of the driving signal and the pulse width of the output laser, to thereby determine an optimum peak voltage.

Compared with the known designs of conventional prior art, the present invention has the following technical advantages: a method for generating a sub-nanosecond pulse laser is reliably provided, and the method is applied to a voltage-increased type electro-optical Q-switched laser. According to the present invention, a driving signal whose peak voltage is higher than the quarter-wave voltage of a Pockels cell in an electro-optical Q switch is applied on the Pockels cell, so that the electro-optical Q switch changes from a switched-off state to a switched-on state, and then changes to a partially-switched-on state. When the Q switch is switched-off, the laser gain medium absorbs pump light to implement population inversion and accumulation; when the Q switch is switched-on, a laser is polarized in the resonator, and a pulse laser is output by using a coupler; and when the Q switch is partially switched on, intracavity laser is coupled out through both the output coupler and the polarizer. The intracavity oscillating laser is exhausted within a quite short time, so that the pulse width of the output laser is shortened, to thereby implement output of a sub-nanosecond pulse laser.

BRIEF DESCRIPTION OF THE DRAWINGS

Various additional features and advantages of the invention will become more apparent to those of ordinary skill in the art upon review of the following detailed description of one or more illustrative embodiments taken in conjunction with the accompanying drawings. The accompanying drawings, which are incorporated in and constitute a part of this specification, illustrate one or more embodiments of the invention and, together with the general description given above and the detailed description given below, explain the one or more embodiments of the invention.

DETAILED DESCRIPTION

In order to make the above object, features and advantages of the present invention more clear and obvious, the present invention will be described in detail with reference to the appended drawings and embodiments hereinafter. The embodiments of the present invention will be described below in a clear and complete manner in conjunction with the appended drawings. It should be appreciated that the described embodiments are only a part of the embodiments encompassed by the present invention. All other embodiments obtained by those skilled in the art based on the embodiments disclosed herein without further creative efforts shall fall within the protection scope of the present invention.

As noted above, one objective of the present invention is to provide a method for generating a sub-nanosecond pulse laser, to shorten the falling edge of a laser pulse when a conventional cavity length is used and no other component is inserted, to thereby implement output of a sub-nanosecond pulse laser. To make the objectives, features, and advantages of the present invention more apparent, the following further describes the present invention in detail with reference to the accompanying drawings and specific embodiments.

Figure 1:
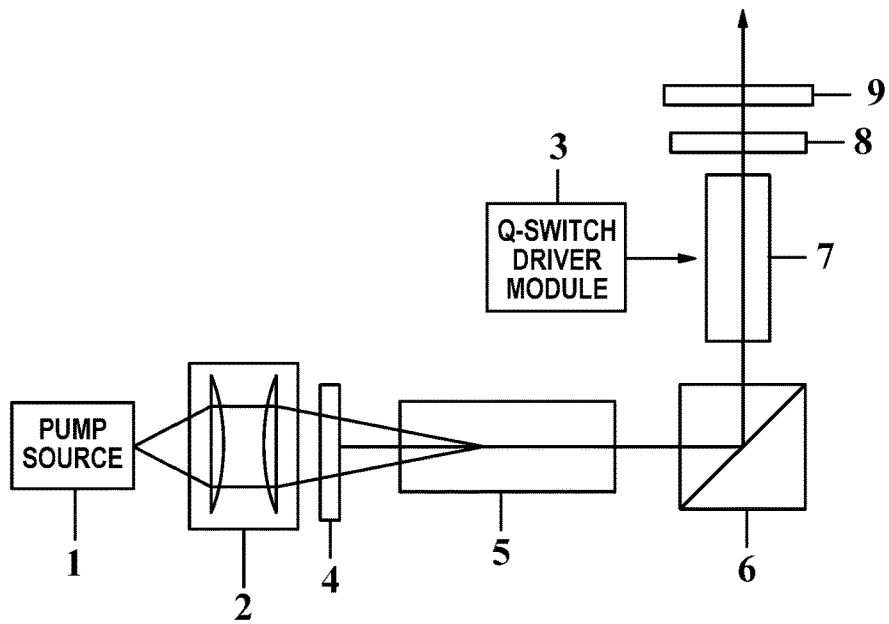
FIG. 1 is a schematic structural diagram of an electro-optical Q-switched laser that may be used to perform at least one embodiment of the method of the present invention.
Figure 2:
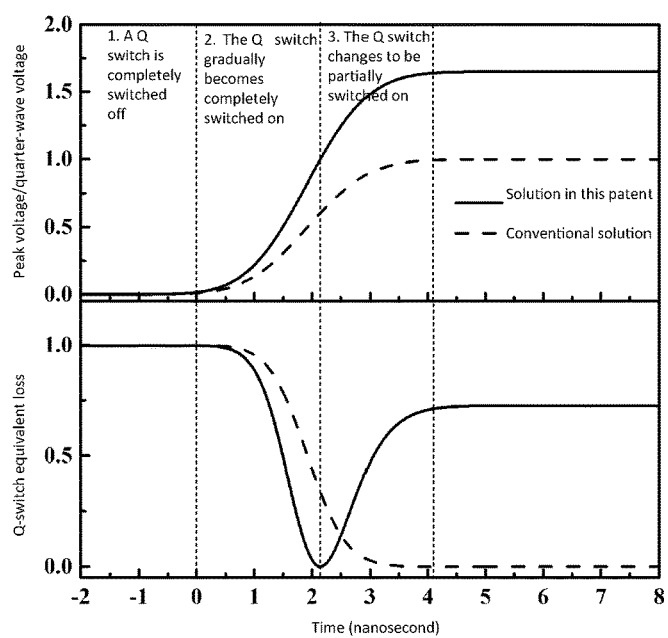
FIG. 2 is a graphical plot showing the voltage of a driving signal applied on the Pockels cell and the intracavity loss caused by the Q switch of the Q-switched laser, measured over time, which are obtained by using a conventional method and by using one embodiment of the method of the present invention.

FIG. 2 is a schematic graphical plot showing the voltage of a driving signal applied on a Pockels cell 7 and the intracavity loss caused by a Q switch (of a Q-switched pulse laser as shown in FIG. 1), measured over time, which are obtained by using a conventional method and by using one embodiment of the method of the present invention. The differences in this aspect between the conventional method and the method of the present invention are clearly shown by the comparison in FIG. 2.

A laser gain medium 5 in an electro-optical Q-switched laser absorbs pump light leading to an accumulation of inverted populations. When the inverted populations are accumulated to maximum, the laser generates a control signal, and sends the control signal to a Q-switch driver module 3.

The Q-switch driver module 3 applies a driving signal on the Pockels cell 7. The driving signal is triggered by the control signal. The driving signal is a square-wave signal whose peak voltage is higher than a quarter-wave voltage of the Pockels cell 7.

The refractive index of the Pockels cell 7 is changed under the action of the driving signal, so that the polarization direction of an intracavity laser beam that is polarized by a polarizer 6, is rotated after the beam passes through the electro-optical Q switch. Within the rising edge of the driving signal, while the voltage increases from 0 to the peak voltage, the rotation angle of the polarization direction of the intracavity beam increases gradually from 90° to a peak angle after the beam passes through the Q switch two times, where the peak angle is greater than 180°. The plot of solid lines in FIG. 2 show the time dependence of voltage of the driving signal and the time dependence of intracavity loss caused by the polarization rotation of intracavity laser beam, according to the present invention. As a comparison, the plot of dashed lines in FIG. 2 show the time dependence of voltage of the driving signal and the time dependence of intracavity loss caused by the polarization rotation of intracavity laser beam, according to a conventional method of operating a Q-switched laser design. When the voltage of the driving signal is 0, the polarization direction of the intracavity beam rotates by 90° after the beam passes through the electro-optical Q switch two times, leading to an intracavity loss of 100%, thus the laser cannot start oscillation. When the voltage of the driving signal increases to the quarter-wave voltage, the polarization direction of the intracavity laser beam rotates by 180° after the beam passes through the electro-optical Q switch two times, leading to an intracavity loss of 0, and the laser starts oscillation in the resonator and is coupled out via the output coupler 9. During a process in which the voltage of the driving signal increases from the quarter-wave voltage to the peak voltage, the polarization direction of the intracavity laser beam rotates by the peak angle after the beam passing through the electro-optical Q switch two times, leading to an intracavity loss equal to the final loss, where the final loss is between 0 and 100%, such that the laser oscillates back and forth in the resonator, and a part of the intracavity laser is coupled out via the output coupler 9 and the other part is coupled out via the polarizer 6.

There is an optimum value of the peak voltage of the driving signal. Under the action of the optimum peak voltage, the pulse width of the electro-optical Q-switched laser is shortened to the greatest extent. The optimum value of the peak voltage may be obtained by theoretical simulation and/or experimental optimization. To this end, laser parameters such as spectral properties and geometric dimension of the gain medium, spatial distribution and energy of the pump light, the resonator length, the transmission of the output coupler, the time-varying loss function of the Q switch, and so on, are substituted into known laser rate equations to perform theoretical simulation to obtain a relationship between a peak voltage of the driving signal and a pulse width of the laser, so as to obtain the optimum peak voltage and further perform experimental verification and optimization.

Figure 3:
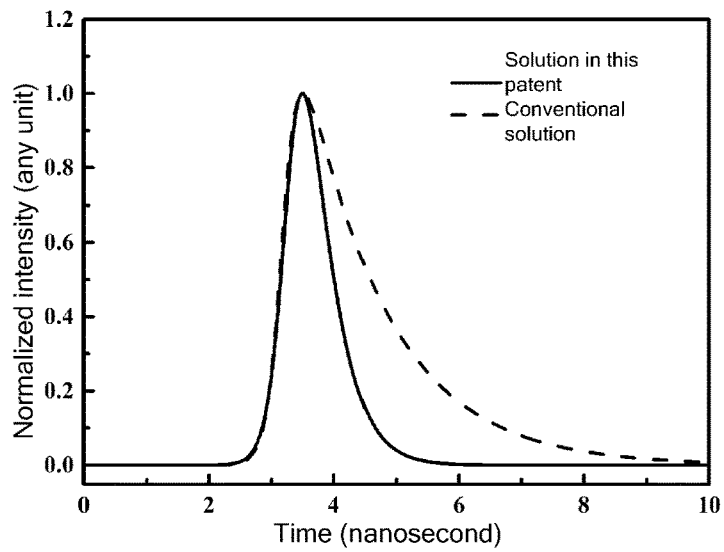
FIG. 3 is a graphical plot of pulse waveforms, obtained by theoretical simulation of pulse lasers obtained by using a conventional method and by using one embodiment of the method of the present invention.

FIG. 3 is a schematic graphical plot of pulse waveforms, obtained by theoretical simulation of pulse lasers obtained by using a conventional method and by using one embodiment of the method of the present invention. A dashed line and a solid line in FIG. 3 respectively represent the laser pulse waveforms obtained in a same condition by using the conventional method (the peak voltage of the driving signal is equal to the quarter-wave voltage of the Pockels cell 7) and by using the method of the present invention. According to the simulation results shown in FIG. 3, the pulse width of an electro-optical Q-switched laser can be shortened from one nanosecond to the desired sub-nanosecond level using the method of the present invention.

Figure 4:
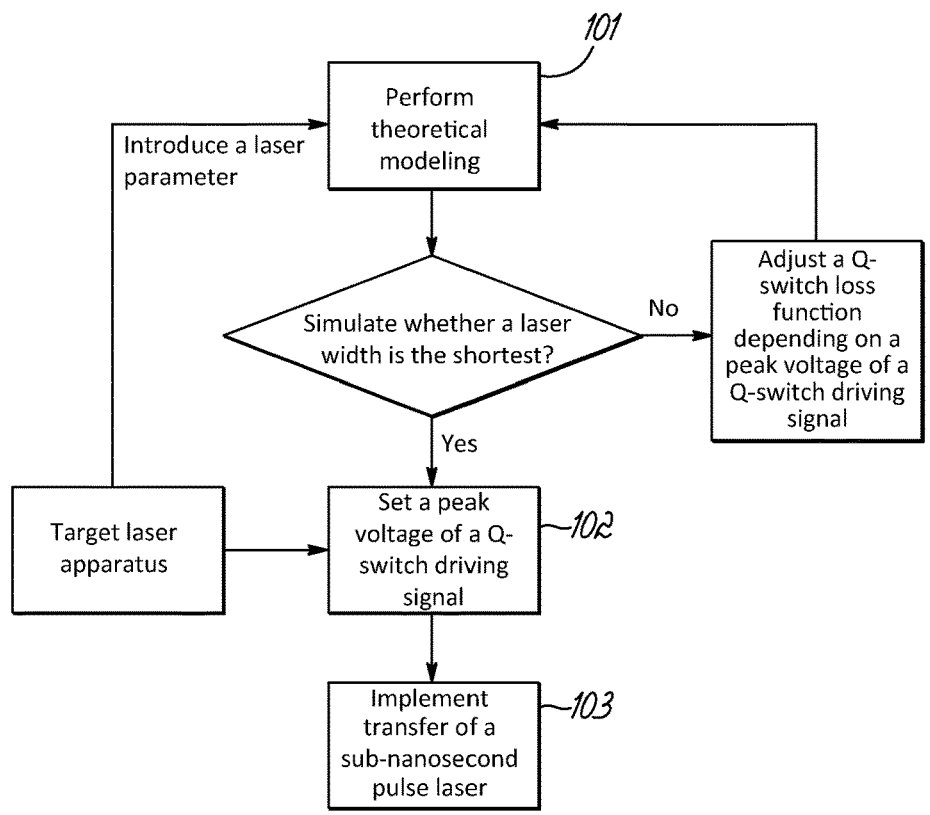
FIG. 4 is a flowchart of the method for generating a sub-nanosecond pulse laser, in accordance with an embodiment of the present invention.

One embodiment of the method for generating a sub-nanosecond pulse laser is shown in FIG. 4 as applied to the electro-optical Q-switched laser shown in FIG. 1, and specific implementation steps include the following.

Step 101: Obtain the parameters of the electro-optical Q-switched laser apparatus, where the parameters include spectral properties and geometric dimension of the laser gain medium 5, energy and spatial distribution of a pump laser provided by a pump source 1 (which may be injected into the laser gain medium 5 after passing through a beam shaping focusing system 2 as shown in FIG. 1), the resonator length, the transmission of the output coupler 9, and the like.

Step 102: Set a peak voltage of a Q-switch driving signal, and obtain a corresponding time dependent function of the Q-switch loss. The function and the parameters obtained in step 101 are substituted into a rate equation model of the electro-optical Q-switched laser to perform theoretical simulation, to obtain the relationship between a peak voltage of the driving signal and a pulse width of the laser, to determine an optimum peak voltage.

Step 103: Turn on the pump source 1, so that the laser gain medium 5 in the electro-optical Q-switched laser absorbs energy of the pump light and generates and accumulates inverted populations; and when the inverted populations are accumulated to maximum, generates a control signal, and sends the control signal to a Q-switch driver module 3. The Q-switch driver module 3 applies a driving signal on a Pockels cell 7 in the electro-optical Q switch under trigger of the control signal, where the driving signal is a square-wave signal whose peak voltage is higher than the quarter-wave voltage of the Pockels cell 7, and the peak voltage is the optimum peak voltage screened out in step 102.

Figure 5:
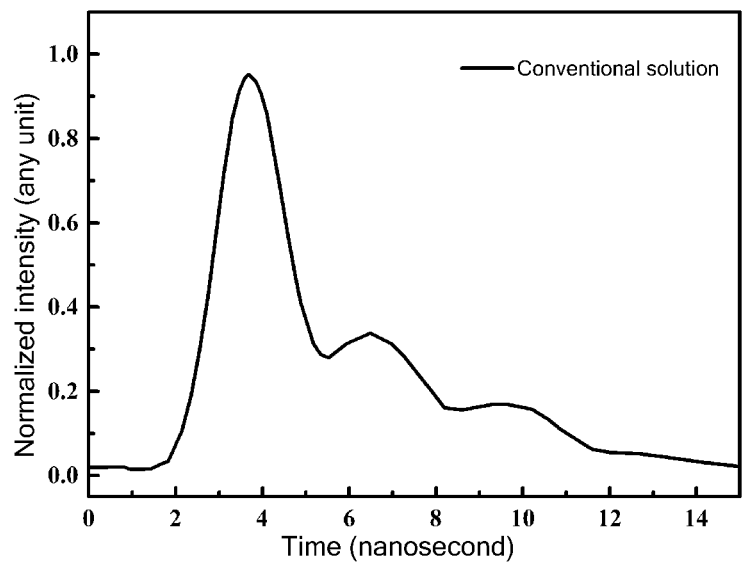
FIG. 5 is a graphical plot of a pulse waveform, obtained by experimental measurement of a pulse laser obtained by using a conventional method.
Figure 6:
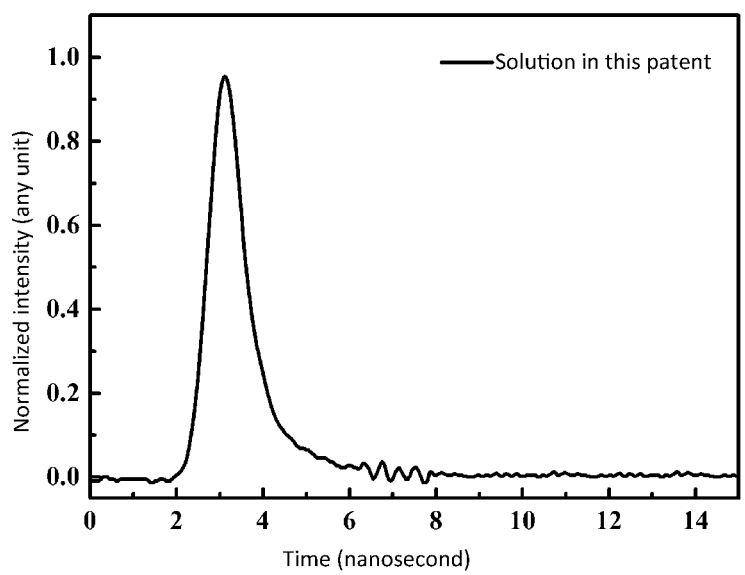
FIG. 6 is a graphical plot of a pulse waveform, obtained by experimental measurement, of a pulse laser obtained by using one embodiment of the method of the present invention.

FIG. 5 and FIG. 6 are schematic graphical plots of pulse waveforms generated by experiments of pulse lasers obtained by using, respectively, a conventional method and by using one embodiment of the method of the present invention. The experiment conditions are as follows. The pump source 1 is a laser diode whose center wavelength is 808 nm, and a pulse current driver is used to implement quasi-continuous pumping, and operates at a repetition frequency rate of 1 kHz with a duty cycle of 25%. The laser gain medium 5 is a composite neodymium-doped yttrium vanadate (Nd:YVO4) crystal cut along the a axis, which has a size of 3×3×(2+6) mm$^3$ and a neodymium (Nd$^{3+}$) ion doping concentration of 0.5 at. % (molar percentage). The polarizer 6 is a polarized beam splitter (PBS) with an extinction ratio of 1000:1. The Pockels cell 7 is formed by two pieces of rubidium titanyle phosphate (RTP) crystals that are placed orthogonal to each other, and the quarter-wave voltage of the Pockels cell 7 is 880 V. The output coupler 9 is a plane-concave mirror with a radius of curvature of 1000 mm and has a transmittance of 30% specific to a 1064 nm laser. The input mirror 4 is a plane mirror that is high transmission coated at 808 nm and high reflection coated at 1064 nm. The Q-switch driver module 3 is a Q-switch driving source whose rise time is 5 ns, fall time is 150 ns, and high level voltage duration is 220 ns. The resonator length is 72 mm. According to a theoretical simulation result, when peak pumping power is 27 W, the optimum peak voltage is 1420 V. When a driving signal whose peak voltage is 880 V is applied on the Pockels cell 7, the pulse width of the pulse laser obtained in experiment is 2.1 ns, and the laser pulse waveform is shown in FIG. 5 (e.g., the conventional method result). When a driving signal whose peak voltage is 1420 V is applied on the Pockels cell 7, the pulse width of the pulse laser obtained in experiment is 0.9 ns, and the laser pulse waveform is shown in FIG. 6 (e.g., the method result of the present invention).

It is therefore confirmed, according to the foregoing embodiments, that when a conventional resonator length is used and no other additional component is inserted, the method of the present invention can rapidly change, only by changing a peak voltage of a driving signal, the intracavity loss to decrease the pulse width of a pulse laser, so as to advantageously implement sub-nanosecond operation of a pulse laser.

Although the principle and implementations of the present invention have been described above by specific examples in the present invention, the foregoing description of the embodiments is merely for helping understanding the method and core idea of the present invention. Meanwhile, various alterations to the specific implementations and applications may come to a person of ordinary skill in the art according to the concepts of the present invention. In conclusion, the contents of the description shall not be regarded as limitations to the present invention.

REFERENCE LIST

1: Pump source
2: Beam shaping focusing system
3: Q-switch driver module
4: Input coupler
5: Laser gain medium
6: Polarizer
7: Pockels cell
8: Quarter-wave plate
9: Output coupler
101, 102, 103: Steps of method shown in FIG. 4

What is claimed is:

1. A method for generating a sub-nanosecond pulse laser using a voltage-increased type electro-optical Q-switched laser, the method comprising:
   absorbing, by a laser gain medium in the electro-optical Q-switched laser, pump light; generating and accumulating inverted populations; and when the inverted populations are accumulated to maximum, generating a control signal, and sending the control signal to a Q-switch driver module;
   applying, by the Q-switch driver module, a driving signal on a Pockels cell in an electro-optical Q switch under trigger of the control signal, wherein the electro-optical Q switch includes a quarter-wave plate and the Pockels cell, and the driving signal is a square-wave signal whose peak voltage is higher than a quarter-wave voltage of the Pockels cell;
   performing, by the driving signal, a change of a refractive index of the Pockels cell in the electro-optical Q switch, so that a polarization direction of an intracavity laser beam, polarized by a polarizer, rotates after the beam passes through the electro-optical Q switch; and
   performing, by controlling a loss related to the electro-optical Q switch with a voltage of the driving signal increasing continuously from 0 to the peak voltage, a change of the working state of the electro-optical Q switch from a switched-off state to a switched-on state, and then to a partially-switched-on state,
   wherein when the Q switch is switched-off, the laser gain medium absorbs the pump light to implement population inversion and accumulation; when the Q switch is switched-on, a laser is polarized in a resonator; and a pulse laser is output by using an output coupler; and when the Q switch is partially switched on, the intracavity laser beam oscillates back and forth in the resonator, and the pulse laser is coupled out through both the output coupler and the polarizer.

2. The method of claim 1, further comprising:
   performing at least one of theoretical simulation and experimental optimization on a peak voltage of the driving signal to obtain an optimum peak voltage to produce a shortest pulse width of the laser.

3. The method of claim 2, wherein performing theoretical simulation further comprises:
   substituting a set of laser parameters into laser rate equations to perform theoretical simulation to obtain a correspondence between the peak voltage of the driving signal and the pulse width of the laser that is output, to thereby determine the optimum peak voltage.

4. A method for generating a sub-nanosecond pulse laser, comprising:
   obtaining parameters of electro-optical Q-switched laser apparatus, wherein the parameters include spectral properties and geometric dimension of a laser gain medium, energy and spatial distribution of a pump laser provided by a pump source, a resonator length, and a transmission of output coupler;
   setting a peak voltage of a Q-switch driving signal, and obtaining a corresponding time dependent function of Q-switch loss, wherein the function and the parameters are substituted into a rate equation model of the electro-optical Q-switched laser to perform theoretical simulation to obtain a relationship between a peak voltage of driving signal and a pulse width of the laser, to determine an optimum peak voltage; and
   turning on the pump source, so that the laser gain medium in the electro-optical Q-switched laser absorbs energy of the pump light and generates and accumulates inverted populations; and when the inverted populations are accumulated to maximum, generates a control signal, and sends the control signal to a Q-switch driver module; wherein, the Q-switch driver module applies a continuous driving signal from 0 to a peak voltage on an intracavity pockels cell in the electro-optical Q switch under trigger of the control signal, wherein, the driving signal is a square-wave signal whose peak voltage is higher than the quarter-wave voltage of the pockels cell, and the peak voltage is the optimum peak voltage.

* * * * *